United States Patent Office 2,733,839
Patented Feb. 7, 1956

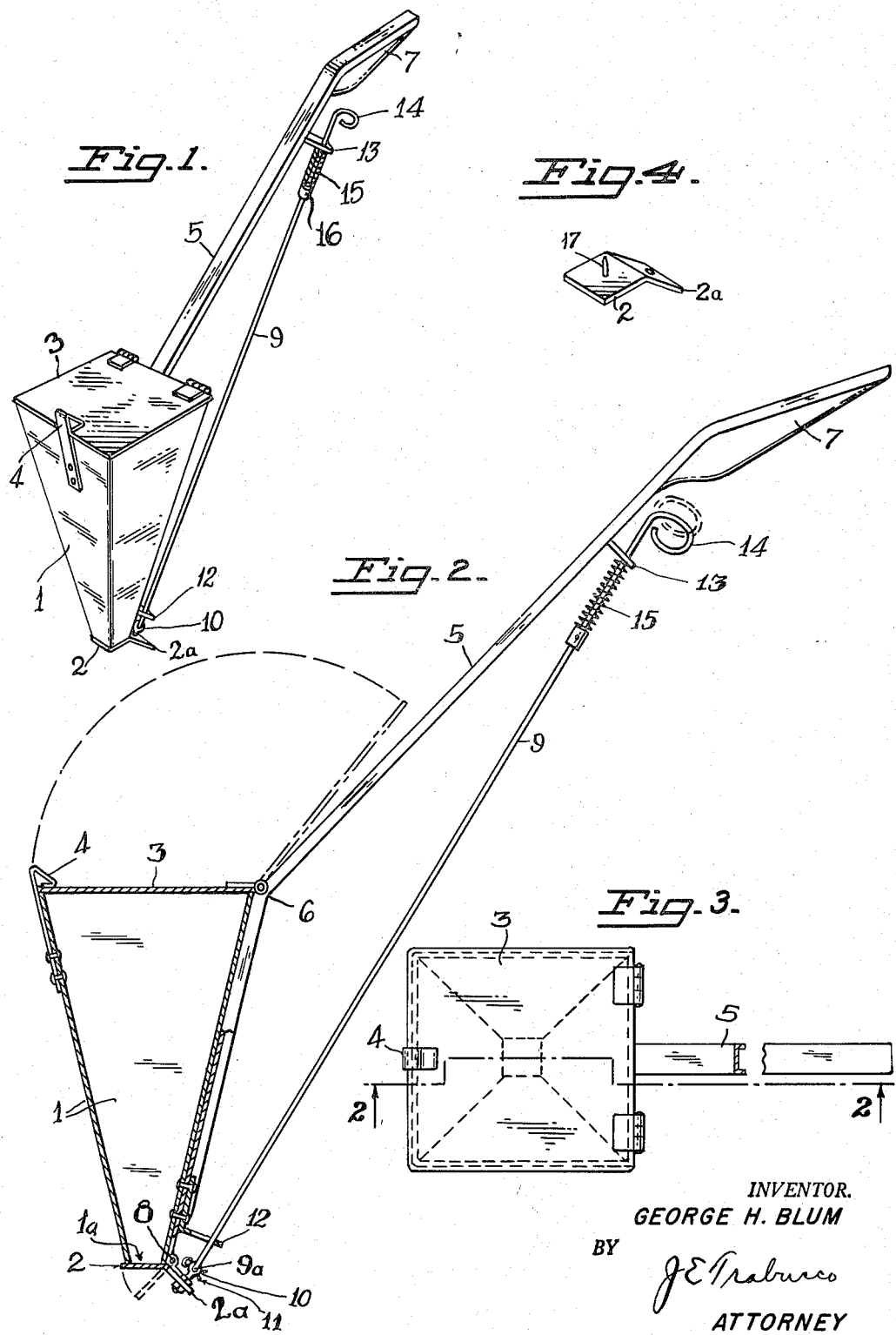

2,733,839

DISPENSER FOR GRANULAR MATERIAL OR THE LIKE

George H. Blum, San Francisco, Calif.

Application September 25, 1951, Serial No. 248,255

2 Claims. (Cl. 222—174)

This invention relates to an improved dispenser for granular or other similar material.

The present invention provides an improved manually controlled dispenser which is particularly useful as a garden accessory for depositing snail exterminating material or the like in selected places within an area infested with such pests. My improved dispenser embodies a container having its sides converging toward a discharge opening through which granular material is dispensed upon the opening of a hand controlled valve door. The container is mounted on an elongated handle bar which provides means for conveniently placing the container over a selected location in the garden where a charge of snail exterminating material is to be deposited. The control means for the valve door is mounted on the handle bar within easy reach, thereby making it possible for a person, with one hand, to conveniently deploy the container over the location where a charge of the material is to be deposited and then operate the discharge control means with the same hand to open the valve door.

The primary object of the present invention is to provide a garden accessory of the kind characterized, embodying an improved dispenser for granular material or the like which may be conveniently carried from place to place and having novel valve means for selectively controlling the discharge of the material therefrom.

Other and further objects of my invention will be pointed out hereinafter or will be indicated in the appended claims or will be obvious to one skilled in the art upon understanding of the present disclosure. For the purpose of this application I have elected to show herein certain forms and details of a dispenser for granular materials representative of my invention; it is to be understood, however, that the embodiment of my invention herein shown and described is for purposes of illustration only and that therefore it is not to be considered exhaustive of the variations of the invention.

In the accompanying drawings:

Fig. 1 is a perspective view of a dispenser for granular material embodying my invention;

Fig. 2 is an enlarged sectional view taken on the line 2—2 of Fig. 3;

Fig. 3 is a top plan view of the dispenser, showing a part of the handle bar broken away; and Fig. 4 shows a modified form of valve door.

Referring to the drawings the numeral 1 designates each of the four converging sides of a container for granular or other material. The container at its smaller lower end is provided with a restricted discharge opening 1a which is controlled by a hinged valve door or closure member 2. The upper enlarged end of the container has an opening for the filling of the container with a supply of granular or other similar material. A hinged lid 3 normally closes the upper opening of the container, and a spring latch 4 secured to the front side 1 releasably extends over an edge of the lid to normally hold the latter in a closed position.

Secured at its lower end portion to the rear side 1 of the container is a handle bar 5 which is preferably U-shaped in cross-section although it may assume other suitable forms as well. The lower end portion of the handle bar 5 extends longitudinally along the rear side of the container from the upper edge of such side to a point near its lower end. The handle bar 5 is bent outwardly as at 6, and the free upper end portion thereof extends well above the container and is provided with a handle 7.

The valve door 2 is hinged to the rear side 1 of the container as at 8, and the said door is provided with a rigid rearwardly disposed extension 2a to which an operating rod 9 is pivotally connected. The valve door 2 and its extension 2a are arranged in suitable angular relation to each other. The means employed in connecting the operating rod 9 to the extension 2a of the door 2 may embody various forms but for illustration purposes I have shown such connecting means as comprising an eye member 10 connecting the rod and the door extension 2a. The rod 9 is formed with a bent end portion 9a which extends through the eye member 10, and a cotter pin 11 extending through the said bent end portion of the rod is arranged to prevent the detachment of the said rod with respect to the eye member.

A rearwardly extending slotted guide member 12 secured to the lower end of the handle bar 5 is arranged so that the operating rod 9 extends through its slot, thereby normally avoiding the imposition of undue damaging strains on the valve door 2 and its hinge 8. The operating rod 9 slidably extends through an opening in a rearwardly projecting guide member 13 secured to the upper end portion of the handle bar 5, the said guide member being positioned directly below the handle 7. The upper end portion of the operating rod 9 is formed with a ring shaped finger piece 14 which is located near the handle 7 and in such a position that a person grasping the handle with one hand may use the index finger of the same hand to engage the finger piece. A spiral compression spring 15 interposed under tension between a fixed collar 16 secured to the operating rod and the guide member 13, serves to actuate the rod downwardly after the latter has been pulled upwardly and released.

In operation the material supplied to the container is normally held therein by the valve door 2 which is held closed by the spring 15 urging the operating rod 9 in a downward direction. When the container has been placed in a desirable position by the person grasping the handle 7, the finger piece 14 is pulled upwardly, thereby causing the operating rod 9 to move in the same direction and thereby pull the door extension 2a upwardly and swing the valve door 2 downwardly to an open position. Until the finger piece 14 is released the valve door 2 will stay open, thereby allowing the contents of the container to flow outwardly through the then open discharge opening. As soon as the finger piece is released the spiral spring 15, exerting its downward pressure on the said rod, causes the rod to move downwardly and thereby close the valve door. The conveying sides of the container normally guide the granular material to the discharge opening, but should lumps obstruct the flow of the material through the said opening, a pointed implement such as a nail or pencil may be projected upwardly through the said opening to break up the obstructing lump or lumps into smaller particles.

As shown in Fig. 4 it is contemplated that in certain embodiments of my invention the valve door 2 may be provided with a rigid pointed pin 17 which is arranged to extend upwardly through the discharge opening and into the container when the said door is closed. By manipulating the finger piece back and forth the pointed pin, engaging with the obstructing lumps, will soon break them into smaller particles capable of readily passing through the discharge opening.

It will be noted that by having the handle bar and the operating rod of considerable length, with the handle and the finger engaging piece arranged in close relationship with respect to each other, a gardener may easily transfer the container to a point near the ground where the granular material is to be discharged and then operate the hinged door without bending over.

What I claim is:

1. In a dispenser for granular material or the like, a tapered material container having downwardly converging sides, the said container having a filling opening at its larger upper end and a discharge opening at its smaller lower end, a hinged closure member pivotally mounted on the lower end of the container and arranged normally to close the discharge opening, the said closure member having a rigid rearward extension, an elongated upwardly extending handle bar secured at its lower end portion to the rear side of the container and having its upper end portion extending well above the container, a rod guiding member extending rearwardly from the upper end portion of the handle bar, an elongated upwardly extending operating rod mounted for up and down movement connected at its lower end to the rigid extension of the closure member and positioned rearwardly of the container and the handle bar, the operating rod slidably extending through the rod guiding member of the handle bar, the upper portion of the operating rod carrying a rigid spring engaging member arranged in spaced relation below the rod guiding member and having a finger engaging member on its upper end, arranged adjacent the upper portion of the handle bar, and a yieldable compression spring encircling the operating rod and arranged in pressure engaging relationship with the rod guiding member and the spring engaging member.

2. In a dispenser for granular material or the like, the structure set forth in claim 1 together with a projecting member carried by the closure member and arranged to project upwardly into the container when the closure member is actuated toward its closed position.

References Cited in the file of this patent

UNITED STATES PATENTS

| Number | Name | Date |
| --- | --- | --- |
| 961,470 | Warren | June 14, 1910 |
| 983,555 | Kelley | Feb. 7, 1911 |
| 1,051,273 | Sandberg et al. | Jan. 21, 1913 |
| 1,818,916 | Wasen | Aug. 11, 1931 |
| 1,888,821 | Fearn | Nov. 22, 1932 |
| 1,898,357 | Finnell | Feb. 21, 1933 |
| 1,956,602 | Wentz et al. | May 1, 1934 |
| 1,966,192 | Tiede | July 10, 1934 |
| 2,127,852 | Adamsen | Aug. 23, 1938 |
| 2,193,253 | Masters | Mar. 12, 1940 |
| 2,513,810 | Masters | July 4, 1950 |
| 2,560,732 | Moore, Sr. | July 17, 1951 |